US 11,017,113 B2

(12) United States Patent
Vaswani et al.

(10) Patent No.: US 11,017,113 B2
(45) Date of Patent: May 25, 2021

(54) DATABASE MANAGEMENT OF TRANSACTION RECORDS USING SECURE PROCESSING ENCLAVES

(71) Applicant: Microsoft Technology Licensing, LLC, Redmond, WA (US)

(72) Inventors: Kapil Vaswani, Cambridge (GB); Manuel Costa, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 214 days.

(21) Appl. No.: 16/200,641

(22) Filed: Nov. 26, 2018

(65) Prior Publication Data

US 2020/0117825 A1 Apr. 16, 2020

(30) Foreign Application Priority Data

Oct. 16, 2018 (GB) ..................................... 1816837

(51) Int. Cl.
*G06F 21/62* (2013.01)
*G06F 16/2455* (2019.01)
(Continued)

(52) U.S. Cl.
CPC ...... *G06F 21/6227* (2013.01); *G06F 16/2455* (2019.01); *G06F 21/602* (2013.01);
(Continued)

(58) Field of Classification Search
CPC ... H04L 63/083; H04L 9/0894; H04L 9/3247; G06F 21/6227; G06F 16/2455; G06F 21/602; G06F 21/64; G06F 2221/2149
(Continued)

(56) References Cited

U.S. PATENT DOCUMENTS

2016/0283731 A1* 9/2016 Chow .................... G06F 21/57
2017/0177898 A1 6/2017 Dillenberger
(Continued)

FOREIGN PATENT DOCUMENTS

CN  106874440 A   6/2017
WO  2017090041 A1  6/2017
(Continued)

OTHER PUBLICATIONS

"Azure Blockchain Workbench Documentation", Retrieved From: https://docs.microsoft.com/en-us/azure/blockchain/workbench/, May 11, 2018, 151 Pages.
(Continued)

*Primary Examiner* — Bryan F Wright

(57) ABSTRACT

A database transaction is executed in a computer of a system of networked computers having secure processing enclaves. Within the secure processing enclave, a database transaction log record for the executed database transaction is generated and cryptographically secured using a private key held in secure storage of the secure processing enclave. A state of the distributed database is recorded in a series of transaction log records which is replicated in distributed computer storage accessible to the networked computers. Consensus messages are transmitted and received via secure communication links between the secure processing enclaves of the networked computers, to incorporate the database transaction log record into the series of transaction log records in accordance with a distributed consensus protocol, which is implemented based on consensus protocol logic held within the secure processing enclave.

20 Claims, 6 Drawing Sheets

(51) Int. Cl.
  *G06F 21/60* (2013.01)
  *H04L 9/08* (2006.01)
  *H04L 9/32* (2006.01)
  *G06F 21/64* (2013.01)

(52) U.S. Cl.
  CPC ............ *G06F 21/64* (2013.01); *H04L 9/0894* (2013.01); *H04L 9/3247* (2013.01); *G06F 2221/2149* (2013.01)

(58) Field of Classification Search
  USPC ......................................................... 713/164
  See application file for complete search history.

(56) References Cited

U.S. PATENT DOCUMENTS

| | | |
|---|---|---|
| 2017/0213209 A1 | 7/2017 | Dillenberger |
| 2017/0279818 A1* | 9/2017 | Milazzo ................ H04L 63/145 |
| 2018/0019867 A1 | 1/2018 | Davis |
| 2018/0040007 A1 | 2/2018 | Lane et al. |
| 2018/0088928 A1 | 3/2018 | Smith et al. |
| 2018/0225661 A1 | 8/2018 | Russinovich et al. |
| 2018/0227119 A1* | 8/2018 | Bibera ................. H04L 63/083 |
| 2018/0232693 A1 | 8/2018 | Gillen et al. |
| 2019/0197260 A1* | 6/2019 | Wang ...................... G06F 21/57 |
| 2019/0238525 A1* | 8/2019 | Padmanabhan ..... H04L 63/0428 |

FOREIGN PATENT DOCUMENTS

| | | |
|---|---|---|
| WO | 2018007828 A2 | 1/2018 |
| WO | 2018170504 A1 | 9/2018 |

OTHER PUBLICATIONS

Christidis, et al., "Blockchains and Smart Contracts for the Internet of Things", In Journal of IEEE Access—Special Section on the Plethora of Research in Internet of Things (IoT), vol. 4, May 10, 2016, pp. 2292-2303.

Mast, et al., "Enabling Strong Database Integrity using Trusted Execution Environments", In Journal of Computing Research Repository, Mar. 2, 2018, 14 Pages.

Russinovich, Mark, "Introducing Azure Confidential Computing", Retrieved From: https://azure.microsoft.com/en-in/blog/introducing-azure-confidential-computing/, Sep. 14, 2017, 6 Pages.

"International Search Report and Written Opinion Issued in PCT Application No. PCT/US2019/049616", dated Dec. 4, 2019, 12 Pages.

* cited by examiner

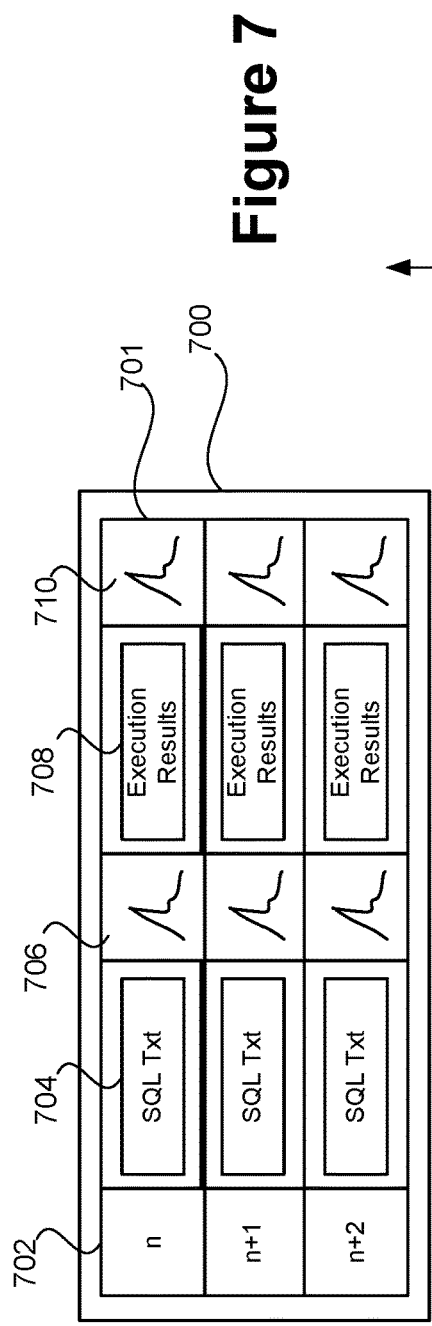
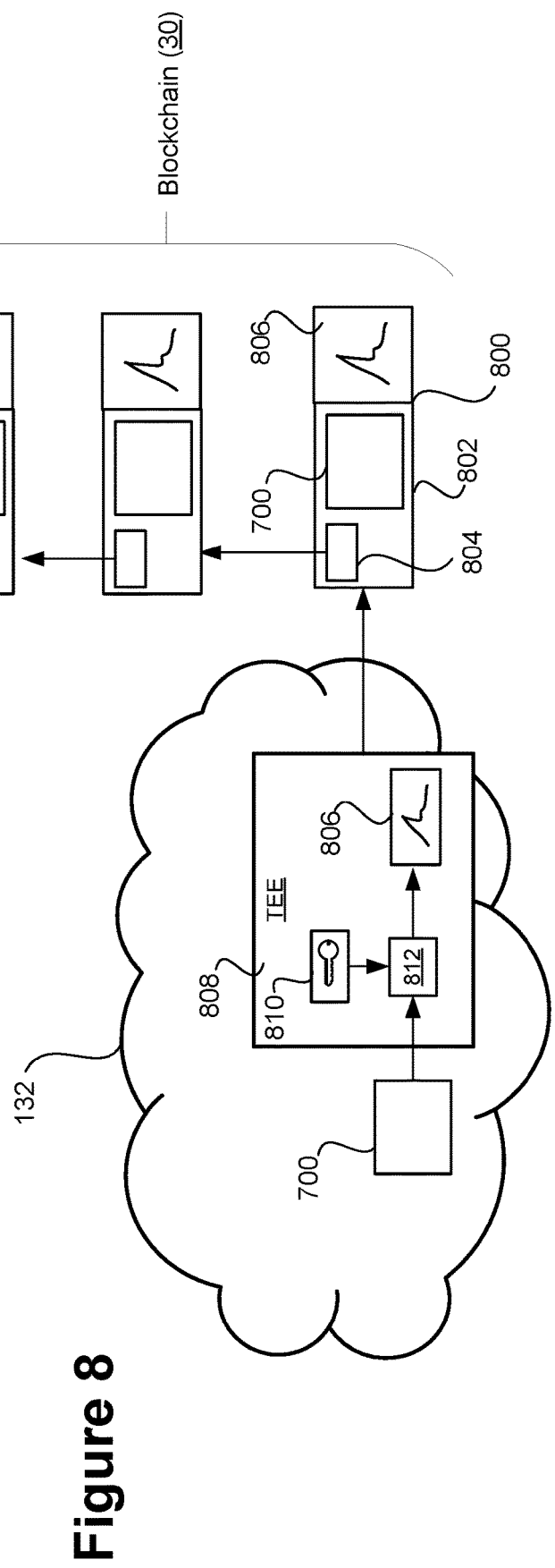
Figure 7
Figure 8

DATABASE MANAGEMENT OF TRANSACTION RECORDS USING SECURE PROCESSING ENCLAVES

TECHNICAL FIELD

The present disclosure relates to database management technology.

BACKGROUND

Conventional database systems, for example those providing shared access to a database by multiple users, often rely upon a trusted third party, for example a database administrator, to administer access permissions and other configuration aspects relating to the database. Transactions requested by users for execution in or in respect of the database are therefore subject to any constraints applied through configuration settings applied by the database administrator. An audit log may be maintained by the database system, recording particular details of user activity in accessing the database. The configuration settings usually determine what is recorded in the audit log. The database administrator may access the audit log for management purposes, for example to perform analysis of log records, for archiving purposes or to invoke any applicable data retention policy.

The database may be a relational database for which transactions are defined using a database management programming language such as SQL (Structured Query Language). SQL is a standard language for managing data within a relational database management system (RDBMS). Database-related operations are instigated by way of commands in the form of SQL statements submitted to a message interface or SQL 'front-end'. SQL is a comprehensive language encompassing a range of functions including data querying, data manipulation, data definition and data control. SQL provide a comprehensive framework for accessing and manipulating different forms of relational database.

SUMMARY

According to a first aspect disclosed herein, there is provided a method of executing a database transaction in a computer of a system of networked computers having secure processing enclaves. One or more statements, in a defined database query language, for executing a database transaction with respect to a distributed database are received at the secure processing enclave of the computer. A database transaction processing engine executed in the secure processing enclave processes the one or more statements in accordance with the database query language to execute the database transaction with respect to the distributed database. Within the secure processing enclave, a database transaction log record for the executed database transaction is generated and cryptographically secured using a private key held in secure storage of the secure processing enclave. A state of the distributed database is recorded in a series of transaction log records which is replicated in distributed computer storage accessible to the networked computers. Consensus messages are transmitted and received via secure communication links between the secure processing enclaves of the networked computers, to incorporate the database transaction log record into the series of transaction log records in accordance with a distributed consensus protocol implemented based on consensus protocol logic held within the secure processing enclave.

BRIEF DESCRIPTION OF THE DRAWINGS

To assist understanding of the present disclosure and to show how embodiments may be put into effect, reference is made by way of example to the accompanying drawings in which:

FIG. 7 shows an example set of transaction log records;

FIG. 8 shows an example blockchain data structure that is secured by a blockchain network based on trusted hardware.

DETAILED DESCRIPTION

Figure 1:
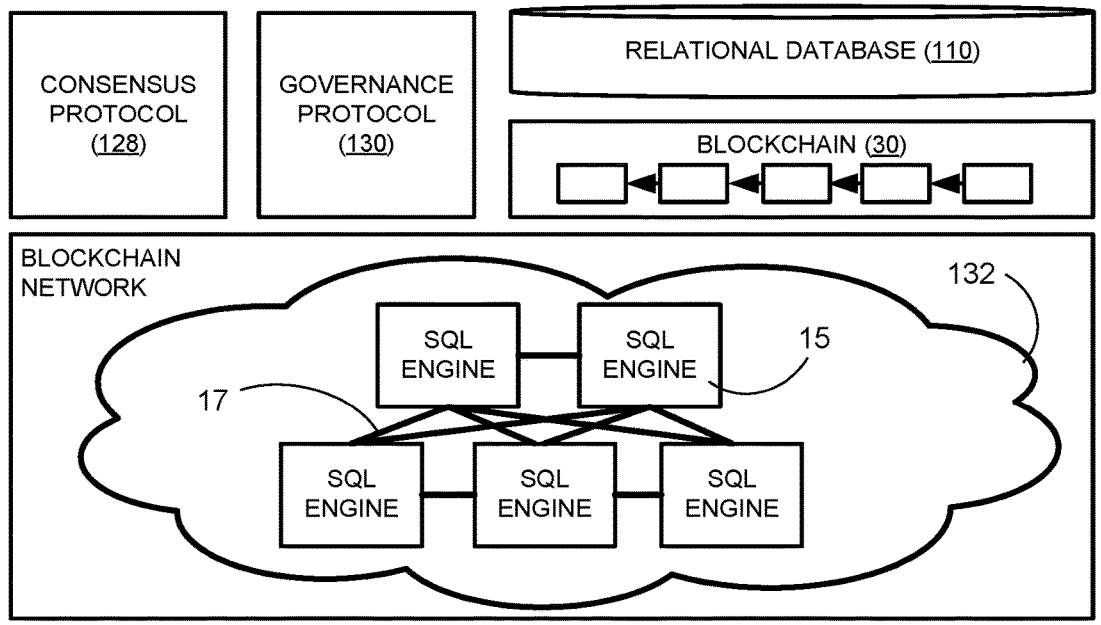
FIG. 1 shows an example of a blockchain network architecture in which a database managements system may be implemented.

Referring briefly to FIG. 1, a blockchain design is described that allows a consortium of mutually untrusting enterprises to set up and operate a SQL-based blockchain 30 with strong confidentiality and tamper-resistance guarantees. A blockchain network 132 is formed of a set of transaction processing SQL Server instances operated by different enterprises. Each SQL instance hosts a database transaction processing engine 15 and application logic inside a TEE (trusted execution environment), which may also be referred to herein as a secure processing enclave. That is to say, it is the SQL server instances which operate as a blockchain network. Each database transaction processing engine 15 is in the form of a SQL engine (e.g. Hekaton). The application logic may for example be in the form of "smart contracts" written in SQL.

Figure 3:
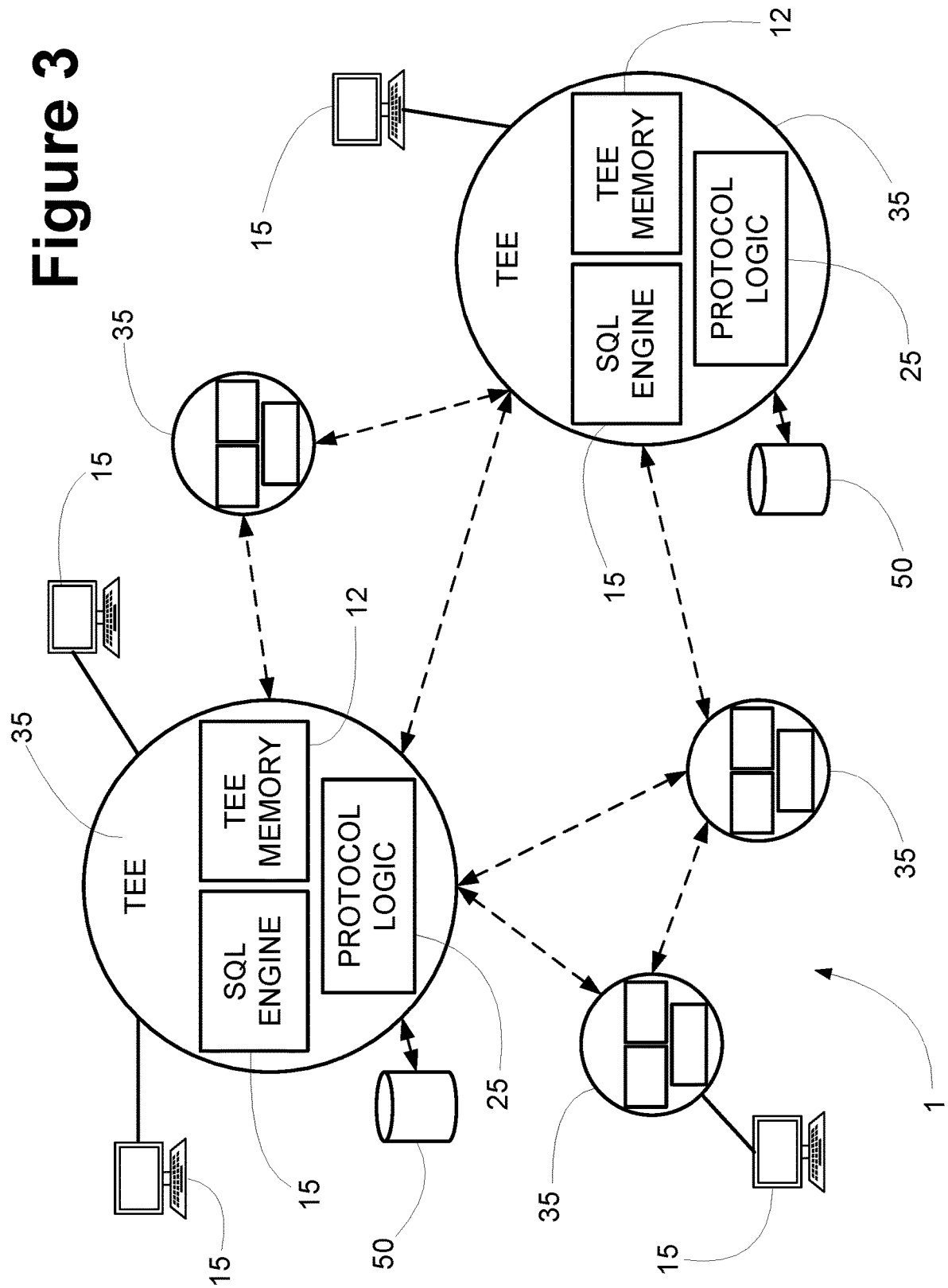
FIG. 3 shows an example of a distributed database system.

The TEEs are not shown in FIG. 1 but are shown in FIG. 3 and described later.

The principles of TEEs and confidential computing are known per se. A trusted execution environment is secured based on cryptography such that data and code (instructions) stored therein and any operations performed therein cannot be viewed or inferred externally, but also such that any alteration to that data or code nonetheless detectable. If any such alteration is detected, the TEE may be disabled to ensure that only authorized operations may be performed and only on authorized data. Intel® SGX (software guard extensions) is one example of a suitable TEE architecture. This allows an application to be partitioned across secure hardware enclaves. Another example is the Virtualization-based Security (VBS) architecture from Microsoft® which uses hardware virtualization to provide a trusted execution environment by isolating a secure region of physical memory from the operating system, and using integrity checks to ensure that code can only be executed within the TEE when it is signed by authorized signers. This is part of what is referred to as "enclave attestation" (the process by which a secure enclave is verified). Further details of confidential computing are not described herein, as existing confidential computing technology can be used to provide TEEs which guarantee the integrity and confidentiality of the code and data executed and stored therein.

The blockchain network 132 hosts a distributed, relational database (DB) 110 which is managed using SQL and which is supported by a form of blockchain technology. Details of this arrangement will now be described.

FIG. 1 is a highly schematic block diagram which illustrates how blockchain technology is used to support the DB 110.

As shown in FIG. 1, the SQL engines 15 are interconnected so as to form the blockchain network 132. The SQL engines 15 and the server instances hosting them operate as nodes of the blockchain network 132 to store, maintain and secure the blockchain 30 referred to above. The blockchain 30 is taken as an authoritative definition of the state of the DB 110.

To this end, a plurality of secure communication links 17 are provided between the different TEEs hosting the SQL engines 15, which used to effect communication within the blockchain network 132, and in particular to implement underlying protocols of the blockchain network. These protocols are fundamental to the operation of the blockchain network 132 and define the manner in which the blockchain 30 is managed and secured by the blockchain network 132.

The underlying protocols include a consensus protocol 128 and a distributed governance protocol 130.

The SQL instances 15 of the blockchain network run the consensus protocol 132 to execute transactions while guaranteeing consistency and fault tolerance. The consensus protocol 132 is the mechanism by which the SQL engines reach a consensus on the state of the blockchain 30 and hence a consensus on the authoritative state of the DB 110 as defined by the blockchain 30.

The blockchain network 132 uses a decentralized governance model, in which operations such as adding/removing users and making database schema changes (such as adding or removing tables, indexes and stored procedures, and defining access control policies) are authorized and performed in accordance with the distributed governance protocol 130 of the blockchain network 132.

The consensus protocol 128 and the distributed governance protocol 130 are hosted in TEEs, in that they are implemented based on secure protocol logic, which is stored within the TEEs and can therefore be trusted. That is not to say that that the protocols are necessarily defined exclusively by the secure protocol logic hosted in the TEEs. For example, the secure protocol logic may permit one or both of the protocols to be changed when defined protocol change requirements are satisfied (for example, based on voting within the blockchain network). However, the secure protocol logic defines the manner in which external information, events etc. outside of the TEEs affect the implementation of the protocols (if at all). Permitted alterations to the consensus protocol 128 and distributed governance protocol 132 may be defined by the distributed governance protocol 130 itself. Such alterations, when effected, may also be recorded in the blockchain 30 (for example).

The blockchain network 132 can be any form of blockchain network that is designed using trusted hardware.

By way of example, a CoCo (Confidential Consortium) Framework for enterprise blockchain networks by Microsoft® provides a trusted foundation that delivers efficient consensus algorithms and flexible confidentiality schemes, and which can support new and existing blockchain protocols (such as Ethereum, Quorum, Corda etc.) with enhanced latency, throughput and confidentiality safeguards. By way of example, reference is made in this context to United States Patent Publication No. US 2018/0225661 A1 and additionally to the publically-available CoCo whitepaper ("The CoCo Framework—Technical Overview", published 10 Aug. 2017; https://github com/Azure/coco-framework/blob/master/docs/Coco%20Framework %20whitepaper.pdf), each of which is incorporated herein by reference in its entirety. In the present context, the blockchain network 132 can be implemented by running the SQL engines 15 on top of the CoCo framework within a network of distributed TEEs.

Whilst traditional blockchain protocols are generally based on a "proof of work" requirement, different forms of consensus protocol can be used in the present context to secure the blockchain 30. By way of example, the above-referenced CoCo framework can support efficient Paxos or Caesar consensus protocols (among others). As noted above, with a trusted hardware implementation, the blockchain itself is secured using public-private key cryptography, wherein valid transactions to be added to the blockchain are cryptographically signed within TEEs provided by the trusted hardware, without the need for expensive proof of work algorithms.

It is known for such blockchain networks to operate according to a distributed governance protocol, which may for example define which blockchain users are authorized to submit transactions to the blockchain network 124 and which users are allowed to access the blockchain 30. With regards to the latter, whilst certain public blockchains store data in plaintext which can be accessed by any user, confidential/consortium networks based on trusted execution hardware allow the blockchain data to be encrypted with access regulated via trusted execution environment (TEEs) provided by the trusted hardware. Other blockchain architectures may also be used to provide a closed, i.e. encrypted or partially encrypted, blockchain to which access can be regulated in accordance with a governance protocol. The distributed governance protocol may for example be implemented based on voting within the blockchain network, wherein voting rights and requirements are defined by the protocol. As noted, it may be possible for the network to agree changes to the distributed governance protocol, and the conditions for doing so may be defined by the districted governance protocol itself.

As the principles of consensus and distributed governance are known, for example, in the context of the CoCo framework, further details are only described herein to the extent they are relevant to the described embodiments. One aspect to note in this respect is their relationship to the DB 110: the consensus protocol 128 is used to reach a consensus as to the state of the distributed DB 110 (with the blockchain 30 ultimately being the authoritative source of the database state), and the distributed governance protocol 130 is used to regulate the operations that may be performed on the DB.

The consensus protocol 128 also provides fault tolerance for the DB 110: because the SQL engines 15 reach a consensus on an agreed state of the blockchain 30 and the database 110, faults can be detected as deviations from the agreed state.

Figure 2:
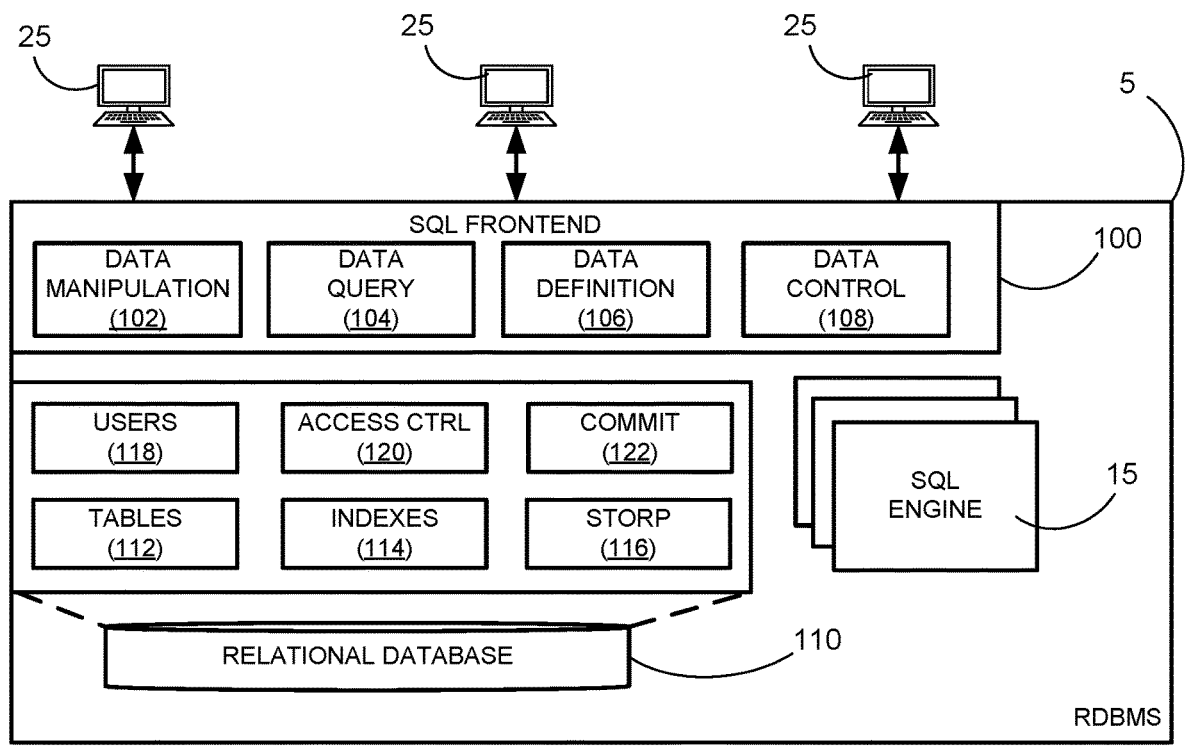
FIG. 2 shows a schematic functional block diagram of a relational database management system.

FIG. 2 shows a highly schematic system block diagram illustrating certain principles of the described technology. A relational database management system (RDBMS) 5 is shown as having an SQL front-end 100 to which SQL clients 25 can submit inputs formed of SQL statements. The SQL front-end 100 accepts and processes such inputs to allow the clients 25 to instigate database transactions relating to the distributed, relational DB 110 managed by the RDBMS. The SQL front-end 100 is provided by the SQL engines 15 of the blockchain network 132.

A database management system (DBMS) refers to a computer program or set of computer programs for creating and managing databases. The DBMS is executed on one or more processors (such as CPUs, GPUs, accelerators etc.) of a database system. A DBMS allows users and applications to interact with a database managed by the DBMS to perform operations such as data creation, manipulation, querying and control, as well as database administration.

Enterprises use the SQL clients 25 to send encrypted requests (transaction execution messages) to execute transactions to the blockchain 30 managed and secured by the blockchain network 132. The requests contain commands in the form of SQL statements which define database transactions to be executed. A database transaction is executed according to one or more commands received in at least one transaction execution message so as to cause a change of state of the DB 110 from a previous state to a new state. A transaction log record is generated for each executed database transaction and the transaction log record is stored in the blockchain 30. Thus a series of transaction log records is created in the blockchain 30 over time.

Each transaction log record corresponds to one of the database transactions and comprises (i) the one or more commands according to which it was executed and (ii) results of its execution, such that the new state of the database is recoverable from that transaction log record and the previous state of the database, whereby the database 110 is fully recoverable from the series of transaction log records stored in the blockchain 30.

All transaction log records are signed and include a corresponding signed request for full auditability. The log can be verified by anyone and can be used to recover the state of the database 110 to an arbitrary point. Log records may be encrypted to preserve the confidentiality of some tables/transactions, using private key(s) stored secure in the TEEs.

The transaction log record records include the full text of each committed SQL query/statement signed by the client 25 issuing the query/statement, along with results generated by the SQL engine 15 which processed that query/statement. Optionally a transaction log record may also include a set of any writes (insert, updates, and deletes) made to the data in the DB 110 during transaction execution.

For various reasons a database transaction might be aborted or fail. In some cases, aborted/failed transactions are also recorded in the blockchain.

The database 110 has a set of defined users 118 who may be authorized to perform operations on the DB 110, in accordance with at least one access control policy 120. As noted, this is ultimately determined based on the distributed governance protocol 130. Hence it is the distributed governance protocol 130 that ultimately determines the authorized users 118 of the database 100, and their roles, permissions etc. Roles and permissions are well-defined concepts in database technology. A user may be assigned one or more roles, which in turn may be associated with one or more permissions, or a user may be associated with one or more permissions directly. The permissions associated with a user (directly or indirectly) specify what operations the user is and is not authorized to instigate in relation to the database 110.

Further examples of the types of operation that might be performed in executing database transactions will now be described.

The SQL front-end 100 is shown to comprise a data manipulation component 102, a data query component 104, a data definition component 106 and a data control component 108. As will be appreciated, these are a high level representations of particular classes of function provided by the SQL engines 15 as part of the SQL front-end 100, and which, despite being shown as distinct components, might have a degree of overlap.

Data definition 106 refers to the creation and modification of a database schema which defines data structures embodied in the DB 110. The data structures may comprise tables 112 (relations) and related components such as indexes 114 for the database 110 and stored procedures 116 (STORPs) which are stored in a database dictionary and can be applied to the DB 110 by users 118/clients 25 who are authorized to do so. Data manipulation 102 refers to the storing, deletion and modification of data within tables 112 and/or other such data structures of the DB 110. Data querying refers to the querying of the DB 110 to obtain desired data. Data control refers to functions relating to the access control policy 120 which, in turn, defines which users 118 can carry out query, manipulation and control operations in respect of which data. This may for example be supported by permissions, roles etc. associated with database users 118. Data control operations can be performed to effect access control changes, such as creating new or modifying existing permissions, roles etc.

An aspect of SQL is the ability to "commit" database transactions for execution in, or in respect of a database, typically by way of a commit statement that is submitted in association with one or more operational statements, such as data query, data access, data control, data manipulation statements or any combination thereof (although "commit" may be implicit for certain operational statements). When a database transaction is committed then, assuming it is valid, the statements contained therein are executed in respect of the DB 110 such that the results become visible to other users. Database statements are committed in accordance with a commit protocol 122 (commit logic) associated with the DB 110. This may be referred to herein as a committed database transaction.

Referring to FIG. 3, a schematic block diagram is provided showing components in an example of a database system 1 in which the RDBMS 5 is executed. The system 1 is shown to comprise a plurality of TEEs 35. Although not shown in FIG. 3, each TEE is provided by secure hardware on a physical server unit on which the SQL engine 15 is executed.

The SQL engine 15 executes within the TEE 15 (also not shown) and has access to secure storage 12 within the TEE 35. As indicated, in the present examples, each SQL engine 15 is hosted by a database server instance, which refers to a virtual machine executed on a physical computer such as a server unit. A server unit can host one or multiple server instances.

Figure 4:
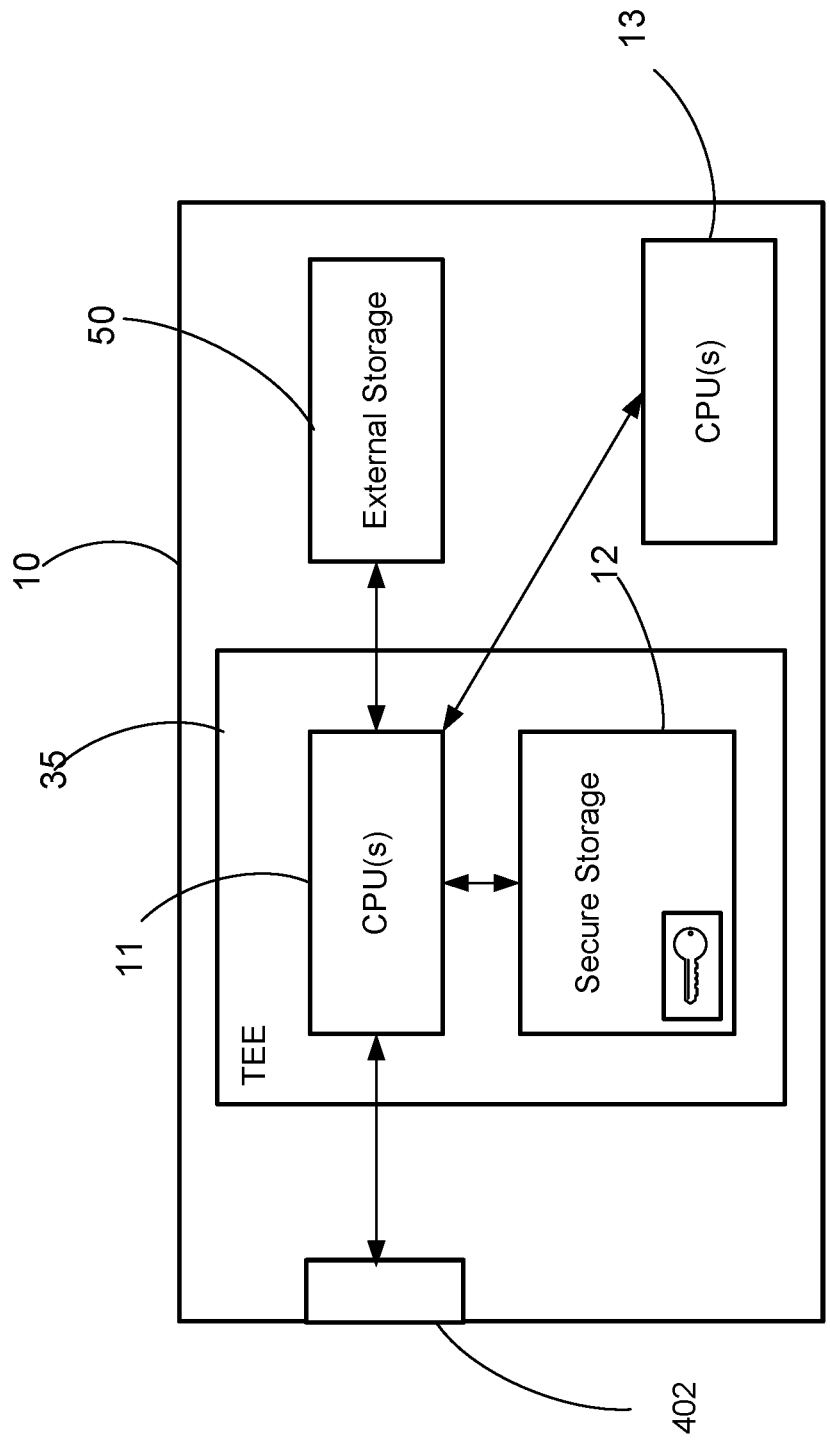
FIG. 4 shows a schematic block diagram of a server unit having a secure processing enclave.

FIG. 4 shows a schematic block diagram of an example server unit 10, which is shown to comprise a TEE 35, at least one secure processor 11 (such as a CPU etc.) for executing the SQL engine 15 and secure storage 12 accessible to the secure processor 11. The secure processor 11 and the secure storage 12 are both within the TEE 11, hence their integrity and confidentiality are guaranteed. The server unit 10 is also shown to comprise untrusted storage 50 accessible to the secure processor 11 but external to the TEE 35, and a network interface 402 for communicating within the blockchain network 132. A secure communication link can be established between the TEE 11 and a remote TEE via the network interface 402. The link is secured based on encryption applied within the TEEs.

As shown in FIG. 4, the server unit 10 may also comprise untrusted hardware such as one or more untrusted processors (such as CPUs, GPUs etc.) outside of the TEE on which computer programs may be executed. Depending on the implementation, it may be that a server instance is executed fully on processor(s) within the TEE 35, or it may be that a server instance is executed in part on the untrusted processor(s) 13. For example, a server instance may be partitioned across a combination of the trusted and untrusted hardware of the server unit 10.

As noted, secure protocol logic 25 is also hosted within each TEE 25, which may take the form of protocol implementation instructions stored in the secure storage 12.

A transaction request may for example comprise a request to read selected data stored in the database, to write data to the database or to amend data stored in the database. Transactions may comprise, for example, requests to view or to edit a schema for the database, for example to view or to edit field or table properties, to add or remove a field or a table, or to view or change some other aspect of the database schema. A transaction may comprise a request to add or remove a user, to change a user's access rights or other properties of a user. A transaction may also comprise a request to add or change properties of an enterprise or other defined group of users. A transaction may also comprise a request to add or change a governance rule or other aspect of a governance model implemented by the system 1. Other database transaction types may be received as would be apparent to a person of ordinary skill in the relevant art.

The server units that make up the blockchain network 132 can be hosted in different enterprise systems and a benefit of the described technology is that is does not assume any relationship of mutual trust between the enterprises. That is, the enterprises or defined user groups of the consortium may be entirely independent and "mutually untrusted" entities i.e. entities having no reason to trust one another in sharing access to a database through the database system 1. Embodiments of the system 1 disclosed herein provide a way for users in the consortium to, for example, share access to one or more databases and to manage the configuration of a database and access to the database by users without a need for trust between the users and without need for a trusted third party to administer rules for access to and configuration of a shared database. In the system 1, the configuration of a database, the rules for access to a database and a governance model controlling how changes to the rules for access and configuration may be enacted, are defined and agreed by enterprises within the consortium using processes operated by the network of the SQL engines 15, as will be described in further detail below.

Figure 5:
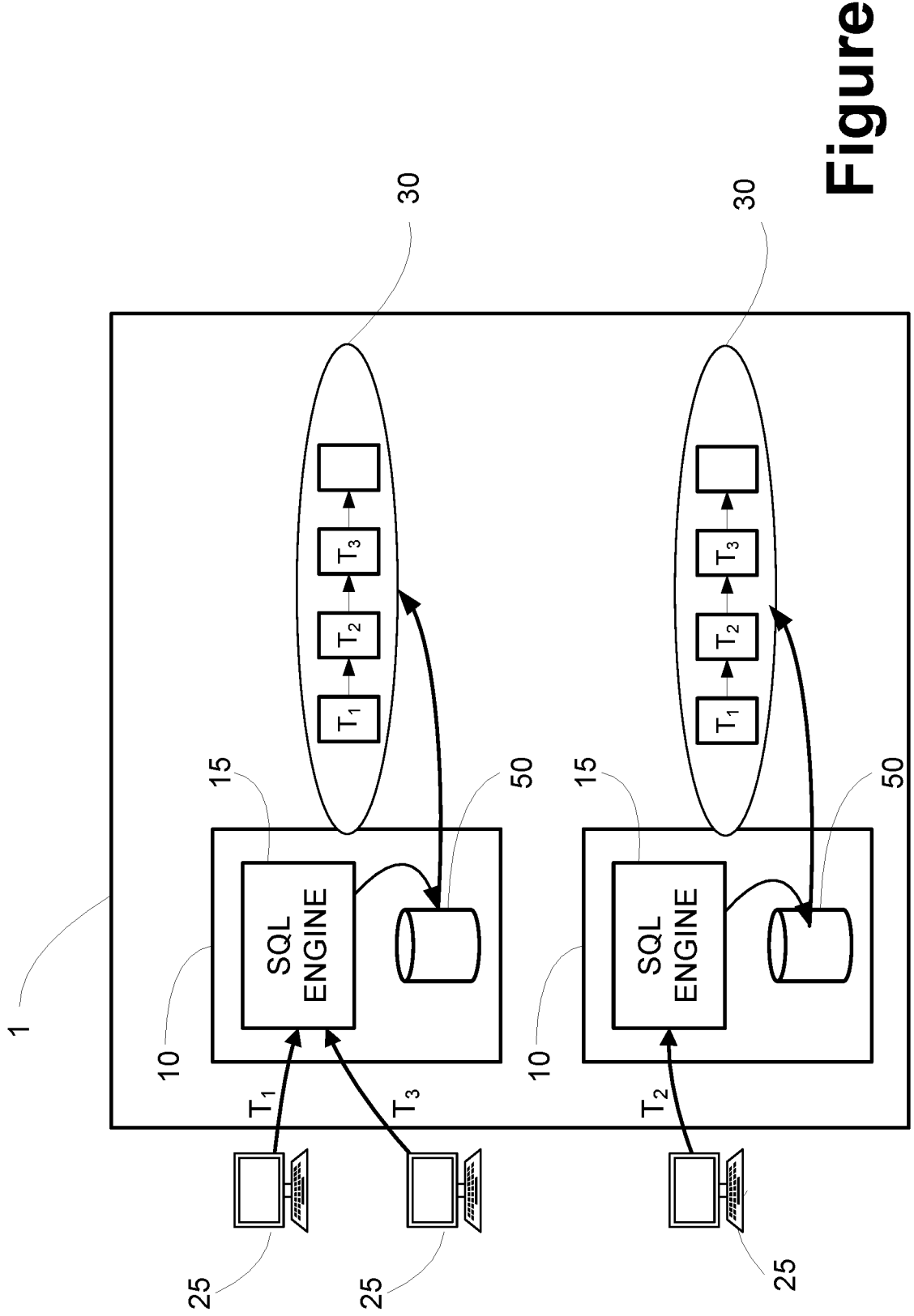
FIG. 5 shows an example of database transactions being recorded in a blockchain.

With reference to FIG. 5, the blockchain 30 is replicated in distributed storage of the system 1. More specifically, each server unit or server instance stores a local copy of the blockchain 30 in persistent memory of its untrusted external storage 50. Because the blockchain 30 is held outside of the TEEs in the untrusted storage 50, it is cryptographically secured in the manner described below. Transactions T1, T2, T3 instigated in response to client requests are communicated across the blockchain network 132 and recorded in each local replica of the blockchain 30 in accordance with the consensus protocol 128. By way of example, FIG. 5 shows transactions T1 and T3 being executed by a first of the SQL engines 15 and transaction T2 by a second. The consensus protocol 128 allows the SQL engines 15 within the blockchain network 132 to reach a consensus on the recording of the transactions T1, T2 and T3 in the blockchain, such that the local replicas of the blockchain 30 are consistent as regards to their constituent transactions and the order of those transactions. This is described in further detail below.

Figure 6:
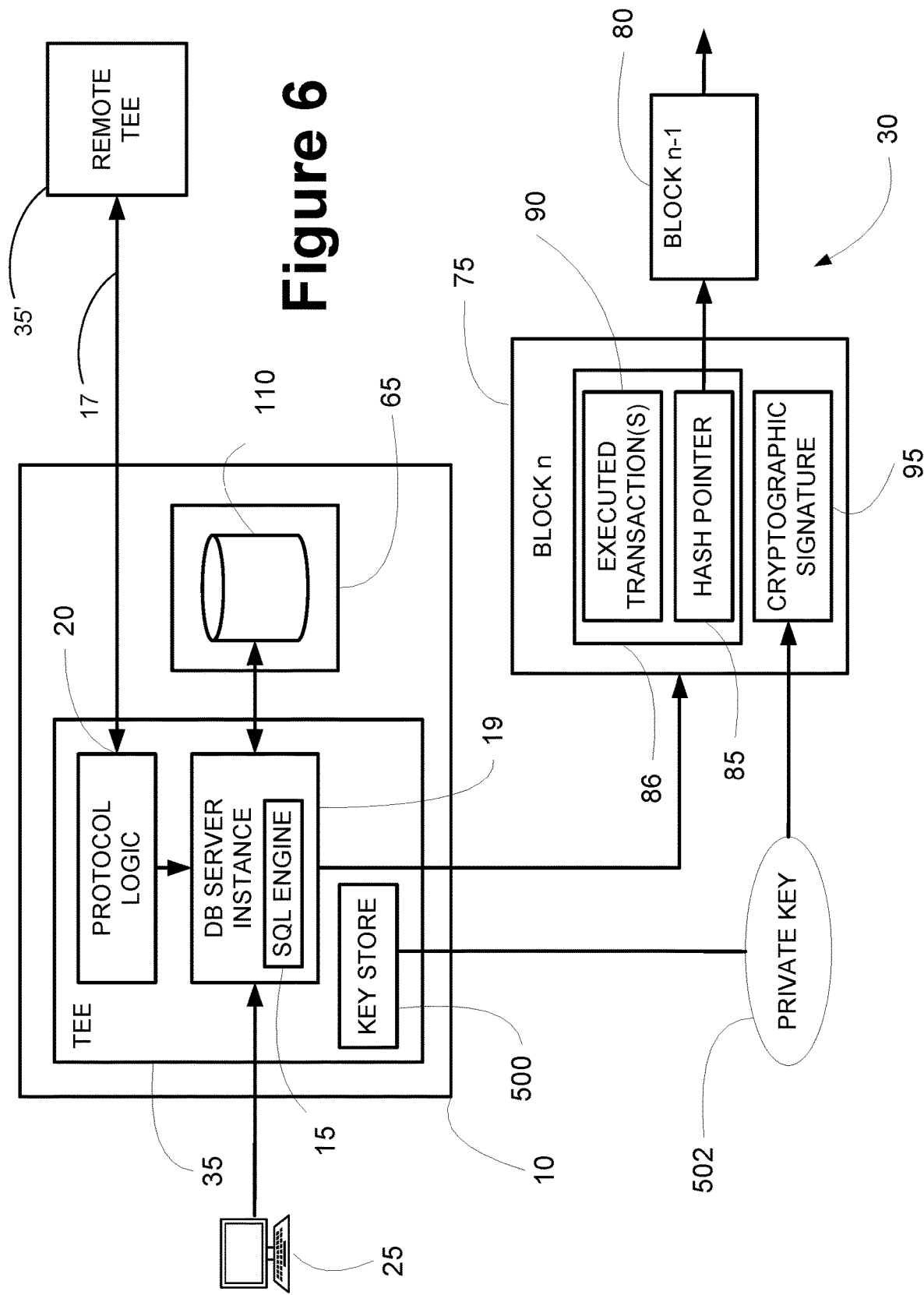
FIG. 6 shows a functional block diagram of a server unit hosting a transaction processing engine in a secure processing enclave.

FIG. 6 shows a schematic function block diagram of the server unit 10 and illustrates how the blockchain 30 is grown and secured. In the described example, the database server instance 19 hosting the SQL engine 15 runs entirely within the TEE 35, although as noted, it is possible to implement the technology with only some of the DB server functions being performed within the TEE 35. In the following example, database transactions are executed and blocks of the blockchain 30 are generated exclusively within the TEE 35 in order to guarantee trust in the blockchain 30.

The transaction processing engine 15 executed in the TEE has access to a secure key store 500 embodied in the secure storage 12 (FIG. 4) of the TEE 35. The secure key store 500 is only accessible within the TEE 35; its contents are not accessible externally. The secure key store 500 holds at least one private key 502 which, despite being shown in FIG. 6 outside of the TEE 35, never leaves the TEE 35 and is inaccessible outside of it. For each database transaction executed by the transaction processing engine 15, a transaction log record is generated. A new block 75 is generated for the blockchain 30 within the TEE 35, which comprises one or more transaction log record records 90 and a block pointer 85, which is a pointer to a previous block 80 in the blockchain 30. The block pointer 85 may be a hash pointer computed as hash of data of the previous block 80. The transaction log record(s) 90 and block pointer 85 each form part of a block payload 81, which is cryptographically signed within the TEE 35. That is, at least one cryptographic block signature 95 is computed from the block payload 86 using the private key 502, and is included in the block 75 for verifying the payload 86.

It is noted, however, that the DB server instance 19 which executes a database transaction will not necessarily be the blockchain network node that adds the corresponding transaction log record to the blockchain 30. This is determined in accordance with the consensus protocol 128. For example, with the Paxos consensus protocol, a leader node is nominated in accordance with the protocol, and transaction log records to be validated are transmitted to the leader node using the secure communication links 17. By way of example, FIG. 6 shows a secure communication link 17 between the TEE 35 and a remote TEE 35', which may for example be the TEE of a leader node. The DB server instance can, as necessary, forward a transaction log record to the remote TEE 35' for validation. Assuming it is determined to be valid, the leader nodes adds it to the blockchain 30 in exactly the same way as described above.

The consensus protocol 128 also defines how new blocks are communicated within the blockchain network 132. For example, with the Paxos protocol, once the nominated leader node has added a new block, the new block is communicated to the other nodes in accordance with the consensus protocol 128 and the other nodes add the new block to their local replica of the blockchain 30 (i.e. the leader's determination is authoritative).

The consensus protocol 128 is a way of achieving fault tolerance. It allows an authoritative state of the blockchain 30, and hence the database 110, to be determined from the local replicas in a manner that is tolerant to faults in the local blockchain replicas. The authoritative state of the blockchain 30 may for example be the state on which a majority of nodes (server instances) agree within the network 132.

Such faults may occur due to corruption of the external storage 50 or deliberate tampering for example. Generally such faults would be detectable, because at least some of the cryptographically signed blockchain data would no long be valid (i.e. no longer match a corresponding cryptographic signature(s) that were applied in the TEE; missing blocks can also be detected from the cryptographically signed block pointers). However, the consensus protocol 128 provides an additional level of fault tolerance for increased robustness.

When a new node (server instance) joints the blockchain network 132, it needs to reconstruct the blockchain 30 up to its current state. The fault tolerance mechanism is used to ensure that the reconstructed blockchain matches a majority of local blockchain replicas within the network. In order for a new node to join the network, it must become a member of the consortium; the conditions for admitting new members to the consortium are set by the distributed governance protocol 130.

The database 110 may be implemented as a distributed in-memory database, i.e. with each server instance maintaining a local replica of the database 110 (database instance) in a portion of main memory 65 of the server unit 10 on which it is hosted. The portion of main memory 65 hosting the in-memory database is preferably within the TEE 35. An example of a suitable in-memory database is Hekaton.

Alternatively, the blockchain 30 containing the log of database transactions may be the only persistent representation of the database and the state required to execute each transaction may be reconstructed from the blockchain only when it is needed to execute a transaction.

FIG. 7 shows an example set of transaction log records 700 stored in the blockchain 30. Each transaction log record 701 comprises a piece of ordering data, which is a sequence number 702 in this example; the full SQL text 704 that defined the original database transaction; at least one client cryptographic signature 706 for verifying the SQL text 704; the results of the execution of the database transaction 708; and at least one server cryptographic signature 710 for verifying the execution results 708. The client cryptographic signature 708 is a signature that was generated from the SQL text 704 by the client 25 that submitted it for execution, using a private key available to the client (which may for example be a private key issued to a particular user who has authenticated with the client 25). The server cryptographic signature 710 is a signature that was generated by the SQL engine 15 that executed the transaction, using a private key available thereto.

Alternatively, the sequence number may be omitted and the ordering of the transactions may be defined by their ordering within the blockchain 30.

The ordering of transactions may for example be determined by the leader node, i.e. the leader node is responsible for defining the order of database transactions on the database 110. More generally, the ordering may be determined according to the consensus protocol 128.

The sequence number, timestamp etc. functions as a transaction identifier for identifying the transaction log record to which it applied.

FIG. 5 shows an example data structure of the blockchain 30. The blockchain 30 is shown to be formed of a sequence of blocks. Each block 800 comprises a payload 802, which in turn is shown to comprise a set of transactions 700 of the kind shown in FIG. 4. Additionally the payload 802 of each block 700 (other than a genesis block which is not shown in FIG. 4) contains a pointer 802 to the previous block in the blockchain. The pointer 804 may for example be a hash pointer, computed by hashing data of the previous block.

In this example, the block payload 802 is secured by a block cryptographic signature 95 which can be used to verify the block payload 802, and hence to verify both the set of transaction log records 700 and the block pointer 804 contained in the payload 802. As indicated above, the block signature 95 is generated by a cryptographic signing function 512 executed within a TEE 808 of the blockchain network 132 using a private key 510 held in secure storage of the TEE 808. This cryptographic mechanism operates entirely independently of the database system 1 and the key 510 within the TEE 808 is not accessible within the database system 1 at all, even if it is compromised. The TEE is provided by trusted hardware within the blockchain network 132 and may also be referred to herein as a secure enclave.

In combination, these three cryptographic signatures, i.e. the client signature 706 and the server signature 710 applied together with the block signature 95, provide a highly robust data verification mechanism for the transaction log records 700.

Whilst FIG. 4 shows a set of three transaction log records, a block payload can contain any number of transaction log records including one.

As noted, according to a first aspect disclosed herein, there is provided a method of executing a database transaction in a computer of a system of networked computers having secure processing enclaves. One or more statements, in a defined database query language, for executing a database transaction with respect to a distributed database are received at the secure processing enclave of the computer. A database transaction processing engine executed in the secure processing enclave processes the one or more statements in accordance with the database query language to execute the database transaction with respect to the distributed database. Within the secure processing enclave, a database transaction log record for the executed database transaction is generated and cryptographically secured using a private key held in secure storage of the secure processing enclave. A state of the distributed database is recorded in a series of transaction log records which is replicated in distributed computer storage accessible to the networked computers. Consensus messages are transmitted and received via secure communication links between the secure processing enclaves of the networked computers, to incorporate the database transaction log record into the series of transaction log records in accordance with a distributed consensus protocol implemented based on consensus protocol logic held within the secure processing enclave.

By way of example, optional implementation features that may be implemented in embodiments of the first aspect are set out below.

The series of transaction log records may be stored in a blockchain and the database transaction log record may be contained in a data block which is added to the blockchain in accordance with the consensus protocol.

The database transaction may be executed in accordance with a set of database privileges. The set of database privileges may be defined by a distributed governance protocol, which is implemented based on governance protocol logic held within the secure processing enclave.

The database may contain encrypted data and the set of database privileges comprises access privileges for the encrypted data, wherein the series of transaction log records is at least partially encrypted using one or more private keys held securely in one or more of the secure processing enclaves such that the encrypted data stored in the database cannot be recovered from the series of transaction log records outside of the secure processing enclaves.

The distributed database may be a relational database and the database query language may be a Structured Query Language (SQL).

The database transaction log record may be cryptographically secured by using the private key to generate a cryptographic signature for verifying the database transaction log record.

The database transaction log record may be cryptographically secured by encrypting the database transaction log record using the private key.

The distributed database is an in-memory database, and an instance of the in-memory database is embodied in processor main memory of each of the networked computers.

A portion of the processor main memory embodying the in-memory database instance may be contained within the secure processing enclave of that computer.

The database transaction may cause a state change in the database from a previous state to a new state. The database transaction log record may comprise the one or more statements, such that the new state of the database is recoverable from the database transaction log record and the previous state of the database.

The database transaction log record may comprise results of the execution of the database transaction as generated by the transaction processing engine The method may further comprise a step of outputting the cryptographically-secured database transaction log record from the secure processing enclave for storing in the distributed computer storage, which is outside of the secure processing enclaves.

The method may further comprise a step of transmitting the cryptographically-secured database transaction log record from the secure processing enclave via a secure communication link to a remote secure processing enclave for processing.

The execution of the database transaction may cause at least one of: a database schema change for the distributed database, and a change in a set of database permissions associated with the database.

The execution of the database transaction may cause data to be queried from, inserted or updated in or deleted from the distributed database.

The distributed governance protocol may be used to determine at least one role and/or at least one permission associated with the database.

The protocol logic may be in the form of protocol implementation instructions stored in the secure storage of the secure processing enclave.

A second aspect of the present disclosure provides a computer for executing a database transaction, the computer comprising: a secure processing enclave containing at least one processor for executing instructions and secure storage accessible to the processor; and a network interface for establishing a secure communication link for transmitting and receiving data to and from the secure processing enclave. The at least one processor is configured to execute computer readable instructions within the secure processing enclave which, when executed, cause the at least one processor to carry out any of the steps disclosed herein.

Another aspect provides a distributed database system comprising a plurality of networked computers, each of which is configured as set out in the preceding paragraph.

Another aspect provides a computer program comprising instructions stored on a computer-readable storage medium, which are configured, when executed on a computer having a secure processing enclave, to implement any of the steps disclosed herein.

It is noted that references to code, software, instructions and the like executed one or more processors (or similar) can mean all of the software are executed on the same processor, or that portions of the code can be executed on different processors, which may or may not be co-located. References to "computer storage", "electronic storage" and any other form of "storage" refer generally to one or more computer-readable storage devices, such as magnetic or solid-state storage devices. For multiple devices, there may or may not be spatially collocated. The features of the techniques described herein are platform-independent, meaning that the techniques may be implemented on a variety of commercial computing platforms having a variety of processors. For example, the systems may include a computer-readable medium that may be configured to maintain instructions that cause the systems, and more particularly any operating system executed thereon and associated hardware of the system to perform operations. Thus, the instructions function to configure the operating system and associated hardware to perform the operations and in this way result in transformation of the operating system and associated hardware to perform functions. The instructions may be provided by the computer-readable medium to the system processor(s) through a variety of different configurations. One such configuration of a computer-readable medium is signal-bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data. The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of executing a database transaction, the method comprising, in a computer of a system of networked computers having secure processing enclaves:
   receiving, at the secure processing enclave of the computer, one or more statements in a defined database query language for executing a database transaction with respect to a distributed database, wherein the secure processing enclave is secured based on cryptography such that contents of the secure processing enclave cannot be viewed externally and such that alteration to the contents of the secure processing enclave is externally detectable;

processing, by a database transaction processing engine executed in the secure processing enclave, the one or more statements in accordance with the database query language to execute the database transaction with respect to the distributed database; and within the secure processing enclave, generating a database transaction log record for the executed database transaction and cryptographically securing the database transaction log record using a private key held in secure storage of the secure processing enclave;

wherein a state of the distributed database is recorded in a series of transaction log records which is replicated in distributed computer storage accessible to networked computers, and the method further comprises:

transmitting and receiving consensus messages via secure communication links between the secure processing enclaves of the networked computers, to incorporate the database transaction log record into the series of transaction log records in accordance with a distributed consensus protocol, which is implemented based on consensus protocol logic held within the secure processing enclave.

2. The method of claim 1, wherein the series of transaction log records is stored in a blockchain and the database transaction log record is contained in a data block which is added to the blockchain in accordance with the consensus protocol.

3. The method of claim 1, wherein the database transaction is executed in accordance with a set of database privileges, wherein the set of database privileges are defined by a distributed governance protocol, which is implemented based on governance protocol logic held within the secure processing enclave.

4. The method of claim 3 wherein the distributed database contains encrypted data and the set of database privileges comprises access privileges for the encrypted data, wherein the series of transaction log records is at least partially encrypted using one or more private keys held securely in one or more of the secure processing enclaves such that the encrypted data stored in the distributed database cannot be recovered from the series of transaction log records outside of the secure processing enclaves.

5. The method of claim 3, wherein the distributed governance protocol is used to determine at least one role and/or at least one permission associated with the distributed database.

6. The method of claim 1, wherein the distributed database is a relational database and the database query language is a Structured Query Language (SQL).

7. The method of claim 1, wherein the database transaction log record is cryptographically secured by using the private key to generate a cryptographic signature for verifying the database transaction log record.

8. The method of claim 1, wherein the database transaction log record is cryptographically secured by encrypting the database transaction log record using the private key.

9. The method of claim 1, wherein the distributed database is an in-memory database, and an instance of the in-memory database is embodied in processor main memory of each of the networked computers.

10. The method of claim 9, wherein a portion of the processor main memory embodying the in-memory database instance is contained within the secure processing enclave of that computer.

11. The method of claim 1, wherein the database transaction causes a state change in the distributed database from a previous state to a new state, wherein the database transaction log record comprises the one or more statements, such that the new state of the distributed database is recoverable from the database transaction log record and the previous state of the distributed database.

12. The method of claim 11, wherein the database transaction log record comprises results of the execution of the database transaction as generated by the database transaction processing engine.

13. The method of claim 1, wherein the method further comprises an operation of outputting the cryptographically-secured database transaction log record from the secure processing enclave for storing in the distributed computer storage, which is outside of the secure processing enclaves.

14. The method of claim 1, wherein the method further comprises an operation of transmitting the cryptographically-secured database transaction log record from the secure processing enclave via a secure communication link to a remote secure processing enclave for processing.

15. The method of claim 1, wherein the execution of the database transaction causes at least one of: a database schema change for the distributed database, and a change in a set of database permissions associated with the distributed database.

16. The method of claim 1, wherein the execution of the database transaction causes data to be queried from, inserted or updated in or deleted from the distributed database.

17. A computer for executing a database transaction, the computer comprising:

a secure processing enclave containing at least one processor for executing instructions and secure storage accessible to the processor, wherein the secure processing enclave is secured based on cryptography such that contents of the secure processing enclave cannot be viewed externally and such that alteration to the contents of the secure processing enclave is externally detectable; and a network interface for establishing a secure communication link for transmitting and receiving data to and from the secure processing enclave;

wherein the at least one processor is configured to execute computer readable instructions within the secure processing enclave which, when executed, cause the at least one processor to carry out the following operations:

receiving, at the secure processing enclave of the computer, one or more statements in a defined database query language for executing a database transaction with respect to a distributed database;

processing the one or more statements in accordance with the database query language to execute the database transaction with respect to the distributed database; and within the secure processing enclave, generating a database transaction log record for the executed database transaction and cryptographically securing the database transaction log record using a private key held in secure storage of the secure processing enclave;

wherein a state of the distributed database is recorded in a series of transaction log records which is replicated in distributed computer storage accessible to networked computers, and said operations further comprise:

transmitting and receiving consensus messages via secure communication links between the secure processing enclaves of the networked computers, to incorporate the database transaction log record into the series of transaction log records in accordance with a distributed consensus protocol, which is implemented based on consensus protocol logic held within the secure processing enclave.

18. The computer of claim 17, wherein the series of transaction log records is stored in a blockchain and the database transaction log record is contained in a data block which is added to the blockchain in accordance with the consensus protocol.

19. A computer program comprising instructions stored on a computer-readable storage device, which are configured, when executed on a computer having a secure processing enclave, to implement the following operations:

receiving, at the secure processing enclave of the computer, one or more statements in a defined database query language for executing a database transaction with respect to a distributed database, wherein the secure processing enclave is secured based on cryptography such that contents of the secure processing enclave cannot be viewed externally and such that alteration to the contents of the secure processing enclave is externally detectable;

processing the one or more statements in accordance with the database query language to execute the database transaction with respect to the distributed database; and within the secure processing enclave, generating a database transaction log record for the executed database transaction and cryptographically securing the database transaction log record using a private key held in secure storage of the secure processing enclave;

wherein a state of the distributed database is recorded in a series of transaction log records which is replicated in distributed computer storage accessible to networked computers, and said operations further comprise:

transmitting and receiving consensus messages via secure communication links between the secure processing enclaves of the networked computers, to incorporate the database transaction log record into the series of transaction log records in accordance with a distributed consensus protocol, which is implemented based on consensus protocol logic held within the secure processing enclave.

20. The method of claim 1, wherein the database transaction log record includes the one or more statements of the database transaction, at least one client cryptographic signature for verifying the one or more statements, results of the execution of the database transaction, and at least one server cryptographic signature for verifying the execution results.

* * * * *